L. H. Olmsted.
Lubricator.

No 47,561. Patented May 2, 1865.

Witnesses:
A. W. Mandeville
J. A. Smith

Inventor:
L. H. Olmsted

UNITED STATES PATENT OFFICE.

LEVERETT H. OLMSTED, OF NEWARK, NEW JERSEY.

IMPROVED LUBRICATOR.

Specification forming part of Letters Patent No. 47,561, dated May 2, 1865.

*To all whom it may concern:*

Be it known that I, LEVERETT H. OLMSTED, of Newark, in the county of Essex, in the State of New Jersey, have invented a new and Improved Mode of Lubricating Shafting in Machinery; and I do hereby declare that the following is a full and exact description thereof, reference being had to the accompanying drawings, and to the letters of reference marked thereon.

Figure 2:
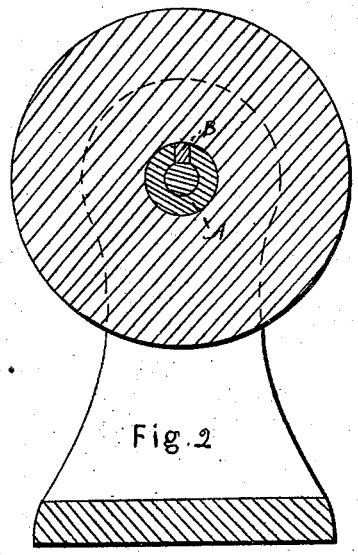
Figure 1:
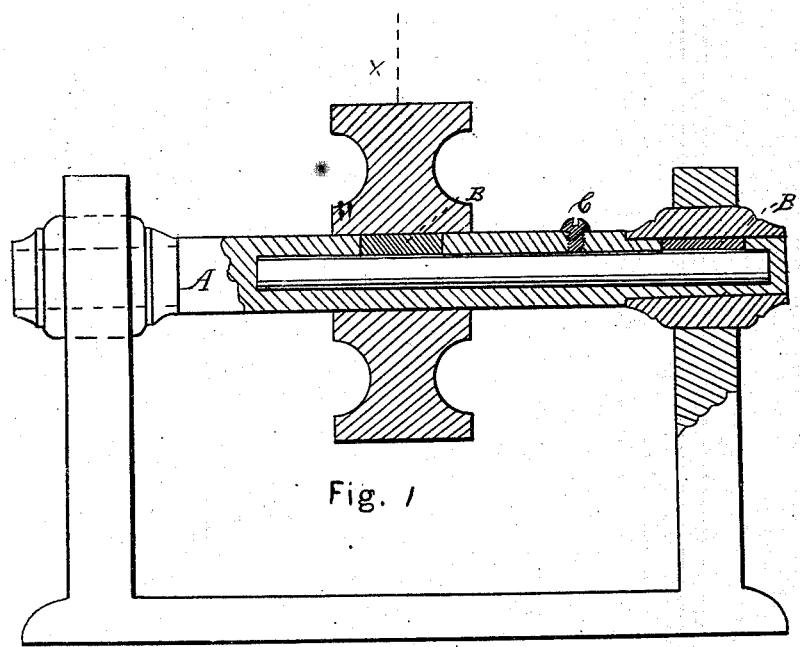

Figure 1 represents a longitudinal section of my invention. Fig. 2 is a sectional end view of the same, taken in the plane indicated by the line $x$, Fig. 1.

The nature of my invention consists in using a hollow shaft with an aperture open from the interior to the exterior at the place where the pulley revolves on the shaft and where the boxes are placed for the shaft to revolve in, which aperture I close with leather or any other substance that will allow the oil (which is placed inside of the shaft) to penetrate through it in sufficient quantity to keep the shaft lubricated.

To enable others skilled in the art to make and use my invention, I will proceed to describe it with reference to the drawings.

A represents a shaft, which is made hollow for the purpose of containing the oil for lubricating the shaft. At B is represented an aperture open from the interior to the exterior of the shaft, for the purpose of allowing the oil to come in contact with the pulley and box. The said aperture I close with leather or any other substance that will allow the oil to pass through it in sufficient quantity to keep the shaft lubricated. At C is a hole which is tapped out and communicates with the interior of the shaft, and is used to pass the oil through to the interior. The hole is then closed by a screw.

My purpose in closing the aperture B with a substance that oil will penetrate is to prevent any more oil escaping from the interior than is necessary to lubricate the shaft.

The mode generally adopted for lubricating shafting is to drill a hole through some part of the pulley or box to pass the oil through to the shaft.

What I claim as new, and desire to secure by Letters Patent, is—

A hollow shaft with an aperture or apertures open from the interior to the exterior, said apertures being closed with leather or any other substance that will produce the intended effect, for the purpose set forth.

L. H. OLMSTED.

Witnesses:
A. W. MANDEVILLE,
J. A. SMITH.